United States Patent
Gutenkunst et al.

(10) Patent No.: US 9,975,636 B2
(45) Date of Patent: May 22, 2018

(54) CARGO RESTRAINING ASSEMBLY, CARGO LOADING SYSTEM AND AIRCRAFT

(71) Applicant: AIRBUS OPERATIONS GMBH, Hamburg (DE)

(72) Inventors: Frank Gutenkunst, Hamburg (DE); André Koehler, Hamburg (DE); Ali Lohmann, Hamburg (DE); Joerg Pump, Hamburg (DE); Soenke Hager, Hamburg (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 253 days.

(21) Appl. No.: 14/619,819

(22) Filed: Feb. 11, 2015

(65) Prior Publication Data

US 2015/0225083 A1 Aug. 13, 2015

(30) Foreign Application Priority Data

Feb. 12, 2014 (EP) ..................................... 14154889

(51) Int. Cl.
*B64D 9/00* (2006.01)
*B60P 1/00* (2006.01)
*B60P 7/14* (2006.01)

(52) U.S. Cl.
CPC ................ *B64D 9/003* (2013.01); *B60P 1/00* (2013.01); *B60P 7/14* (2013.01)

(58) Field of Classification Search
CPC ................... B64D 9/003; B60P 7/14
See application file for complete search history.

(56) References Cited

U.S. PATENT DOCUMENTS

| | | | |
|---|---|---|---|
| 3,059,593 A | 10/1962 | Mack | |
| 3,897,919 A | 8/1975 | Weingarten | |
| 3,906,870 A * | 9/1975 | Alberti | B64D 9/003 244/137.1 |
| 5,765,978 A * | 6/1998 | Looker | B64D 11/0696 410/101 |
| 6,010,286 A | 1/2000 | Cross et al. | |
| 6,568,636 B2 | 5/2003 | Fitzgerald et al. | |

(Continued)

FOREIGN PATENT DOCUMENTS

| | | |
|---|---|---|
| EP | 2 202 149 | 6/2010 |
| WO | WO 03/024792 | 3/2003 |
| WO | WO 2013/192193 | 12/2013 |

OTHER PUBLICATIONS

European Search Report for Application No. 14154889.1 dated Jul. 28, 2014.

*Primary Examiner* — Brian M O'Hara
*Assistant Examiner* — Michael B Kreiner
(74) *Attorney, Agent, or Firm* — Jenkins, Wilson, Taylor & Hunt, P.A.

(57) ABSTRACT

A cargo restraining assembly is configured to be mounted to a cargo deck surface of an aircraft, the cargo restraining assembly comprising two guidance and restraint bars running in parallel to each other, and at least one lateral bracket spanning between the two guidance and restraint bars and being fixedly connected to each of two guidance and restraint bars. The lateral bracket includes a bracket foot formed integrally with the lateral bracket and a quick release mechanism configured to quick-releasably couple the bracket foot to a seat track profile of the cargo deck surface of the aircraft.

20 Claims, 5 Drawing Sheets

(56) References Cited

U.S. PATENT DOCUMENTS

| | | | |
|---|---|---|---|
| 7,785,056 B2 * | 8/2010 | Sanford | B64D 9/00 414/392 |
| 8,690,103 B2 * | 4/2014 | Schulze | B64C 1/20 244/118.1 |
| 2002/0104925 A1 | 8/2002 | Fitzgerald et al. | |
| 2011/0176903 A1 | 7/2011 | Schulze et al. | |
| 2012/0193471 A1 * | 8/2012 | Turschel | B60N 2/01558 244/118.6 |
| 2013/0334367 A1 | 12/2013 | Larson et al. | |

* cited by examiner

CARGO RESTRAINING ASSEMBLY, CARGO LOADING SYSTEM AND AIRCRAFT

CROSS-REFERENCE TO RELATED APPLICATION

This application claims priority to EP 14 154 889.1 filed Feb. 12, 2014, the entire disclosure of which is incorporated by reference herein.

TECHNICAL FIELD

The present disclosure relates to a cargo restraining assembly for restraining cargo items from movement across a cargo deck surface of an aircraft. The present disclosure further relates to a cargo loading system and an aircraft employing such a cargo restraining assembly, especially in aircraft used for aerial cargo delivery.

BACKGROUND

Air cargo is a vital component of many international logistic networks, essential to managing and controlling the flow of goods and other resources from the source of production to the marketplace. For air cargo transportation, as well passenger aircraft and cargo aircraft are used. A passenger aircraft comprises a lower deck for the air cargo which is available under the passenger's main deck. A pure cargo aircraft (also known as freight aircraft, freighter, airlifter, or cargo jet) is an aircraft that is designed or converted for the carriage of goods, rather than for passengers. In cargo aircraft the main deck as well as the lower deck is used to carry cargo.

In modern cargo aircraft, cargo may be loaded through hinged cargo doors located in a side of the fuselage. For loading the cargo aircraft, specifically designed ULDs (unit load devices) are typically used. ULDs are containers or pallets which are used to load luggage, freight and other products into the cargo compartment of an aircraft. It allows a large quantity of cargo to be bundled into a single unit. Since this leads to fewer units to load, it saves ground crew's time and effort.

During loading, the ULDs are transferred into the fuselage through the hinged cargo door and are then maneuvered on the cargo deck which for this purpose comprises a cargo loading system. The cargo loading system typically consists of a plurality of uni-directional or multi-directional transfer supports to ease the passage of ULDs over the surface of the cargo deck and into a final stowed position where they are secured to the cargo deck against movements by a number of either fixed or relocatable restraints. The function of these restraints, commonly referred to as end stop devices, is to prevent movement of the cargo during operation, i.e. during takeoff, flight and landing. During operation, the ULDs are resting against these end stop devices.

At the fore portion of the cargo hold of an aircraft, cargo needs to be restrained from moving forward during deceleration maneuvers of the aircraft. Such cargo restraining barriers, sometimes referred to as buffer stop assemblies, roll and lock into the forward end of an aircraft cargo hold equipped with a roller restraint cargo system. Document U.S. Pat. No. 6,568,636 B2 for example discloses a buffer stop assembly for engagement within cargo aircraft to resist cargo movement. The buffer stop assembly comprises a horizontal member selectively engageable to the aircraft and a substantially vertical member resistant to movement by aircraft cargo, which members are mounted to each other. The vertical member can be moved between an extended position and a transport position overlying the horizontal member.

Typical buffer stop assemblies, such as the one from document U.S. Pat. No. 6,568,636 B2, are movable and fixable along corresponding seat track profiles or rails which are provided in the cargo deck surface. During operation, the complete cargo within the cargo deck is typically secured by the buffer stop assembly which consequently has to take up high forces and loads. Therefore, a specific requirement of buffer stop assemblies is their capability to take very high loads without breaking. Commonly known buffer stop assemblies thus have a rather massive construction. Massive construction, however, means additional weight and costs.

Additionally, the document U.S. Pat. No. 6,568,636 B2 discloses a center and vertical restraint system (CVRS) to enable the cargo hold to load and transport multiple adjacent rows of cargo containers. The CVRS is connected to existing tie down rings in the middle and along the cargo hold via studs. Document US 2013/0334367 A1 discloses an aircraft cargo handling system having a pair of load restraining rail assemblies, each of which has a shaft assembly running substantially parallel to the longitudinal axis of the aircraft. The shaft assembly has a plurality of lock pawls, each of which comprises a body having a cylindrical pallet-engaging surface.

SUMMARY

Accordingly, it is an object of the present disclosure to provide a simple and at the same time fail-safe cargo restraint mechanism that allows for easy handling and improved stowage of the system components.

According to one aspect of the present disclosure, a cargo restraining assembly is configured to be mounted to a cargo deck surface of an aircraft. The cargo restraining assembly comprises two guidance and restraint bars running in parallel to each other, and at least one lateral bracket spanning between the two guidance and restraint bars and being fixedly connected to each of two guidance and restraint bars. The lateral bracket includes a bracket foot formed integrally with the lateral bracket and a quick release mechanism configured to quick-releasably couple the bracket foot to a seat track profile of the cargo deck surface of the aircraft.

According to another aspect of the present disclosure, a cargo loading system comprises a plurality of cargo restraining assemblies, wherein the guidance and restraint bars of adjacent cargo restraining assemblies are connected to each other by a bar link, and wherein the plurality of cargo restraining assemblies form a rail channel running substantially in the middle of the cargo hold from aft to fore of the aircraft.

According to yet another aspect of the present disclosure, an aircraft comprises a cargo hold having a cargo loading system according to the present disclosure.

One idea of the present disclosure is to design a center guidance and vertical restraint channel in the middle of a cargo hold of an aircraft. The center guidance and vertical restraint channel is made up from cargo restraining assemblies which provide guidance in x-direction (from aft to fore of the aircraft) on one hand, and restraint of loaded pallets and cargo containers in y-direction (perpendicular to the x-direction on the cargo deck surface) and z-direction (normal to the plane of extension of the cargo deck surface) on the other hand. The cargo restraining assemblies are suited to be mounted to existing seat track profiles in the floor of the cargo hold by quick-release mechanisms so that the whole center guidance and vertical restraint channel may be assembled and disassembled quickly without the need for complex tools or manpower. Each of the cargo restraining assemblies has little weight so that it can be carried by a single person.

Moreover, the cargo restraining assemblies are designed to be conveniently stowed on seat track profiles of a stowing component, such as a cargo restraint barrier or buffer stop assembly at the fore end of the cargo hold. The buffer stop assembly may thus include an additional stowing seat track profile on which the disassembled cargo restraining assemblies may be stacked in a space saving manner when they are not needed.

Further embodiments of the present disclosure are subject of the following description, referring to the drawings.

According to an embodiment of the cargo restraining assembly, the two guidance and restraint bars may include an angled restraining flange each to which the at least one lateral bracket is fixedly connected, respectively. The restraining flange provides restraint in z-direction for pallets and cargo containers with a protruding bottom edge that can slide underneath the flange.

According to another embodiment of the cargo restraining assembly, the at least one lateral bracket may include a bracket rest formed on top of the bracket foot, the bracket rest being formed to fit to the seat track profile. The bracket rest is adapted to facilitate stowing of the cargo restraining assembly.

According to another embodiment of the cargo restraining assembly, the cargo restraining assembly may comprise at least two lateral brackets arranged in parallel to each other. This advantageously provides additional safety against failure of one of the brackets and increases the mechanical stability of the cargo restraining assembly.

According to another embodiment of the cargo restraining assembly, the guidance and restraint bars may comprise aluminum or an aluminum alloy.

According to another embodiment of the cargo restraining assembly, the bracket foot may comprise steel.

According to another embodiment of the cargo restraining assembly, the at least one lateral bracket may comprise two carrier arms extending upwards to each side of the bracket foot.

According to another embodiment of the cargo restraining assembly, the quick release mechanism may comprise a quick release skewer with a rotating lever. Such a quick release mechanism is easy to handle without complex tools. However, other quick release mechanisms may be possible as well.

According to an embodiment of the cargo loading system, the cargo loading system may further comprise a plurality of cargo guiding assemblies connected to a respective last one of the cargo restraining assemblies, the cargo guiding assemblies being arranged on the floor of a loading ramp of the aircraft.

According to another embodiment of the cargo loading system, the cargo loading system may further comprise a seat track profile mounted to a cargo deck surface of the aircraft, the plurality of cargo restraining assemblies being mounted on the seat track profile via the quick release mechanism.

BRIEF DESCRIPTION OF THE DRAWINGS

The disclosure herein will be explained in greater detail with reference to exemplary embodiments depicted in the drawings as appended.

The accompanying drawings are included to provide a further understanding of the present disclosure and are incorporated in and constitute a part of this specification. The drawings illustrate the embodiments of the present disclosure and together with the description serve to explain the principles of the disclosure herein. Other embodiments of the present disclosure and many of the intended advantages of the present disclosure will be readily appreciated as they become better understood by reference to the following detailed description. The elements of the drawings are not necessarily to scale relative to each other. Like reference numerals designate corresponding similar parts.

DETAILED DESCRIPTION

Skilled artisans will appreciate that elements in the figures are illustrated for simplicity and clarity and have not necessarily drawn to scale. For example, the chosen elements are only used to help to improve the understanding of the functionality and the arrangements of these elements in various embodiments of the present disclosure. Also, common but well understood elements that are useful or necessary in a commercial feasible embodiment are mostly not depicted in order to facilitate a less abstracted view of these various embodiments of the present disclosure. It will also be understood that the terms and expressions used in the present specification have the ordinary meaning as it accorded to such terms and expressions with respect to their corresponding respective areas of inquiry and study except where specific meanings have otherwise be set forth herein.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

Aerial delivery of supplies to a ground based area may be effected by utilizing a container delivery system (CDS). An aircraft configured for CDS includes an aerial delivery rail system in the floor of the cargo hold that usually comprises two or more parallel rails running fore to aft and equipped with parallel rows of fore to aft rollers. Between rows of rails a center channel may be included. The rails, rollers and optionally the center channel extend from a door in the aft section of the aircraft toward the front.

The supplies to be delivered aerially are enclosed within containers or tightly packed nets. Each container (or package) is equipped with a folded parachute canopy. The container and canopy are attached to a pallet or skidboard. Each pallet with attached container and canopy is loaded into the aircraft and slid forward on the rollers. The first containers—depending on the width of the containers—move forward to contact a cargo restraining barrier at the fore portion of the cargo hold. Subsequently loaded containers move forward to contact the preceding containers in their respective loading row. Each container is firmly secured to the aircraft to prevent shifting during flight in either vertical direction (z-direction) or horizontally along the cargo deck (x-direction: from fore to aft; y-direction: perpendicular to the x-direction on the cargo deck).

During use, the aircraft is directed to the desired drop-off point, where the aircraft aft section door is opened and each individual container restraint is unlocked. The pallets and containers leave the cargo hold without usage of extraction parachutes, that is, gravity forces alone are able to effect aft movement of the pallets and containers along the rails to exit through the aft section door. Usually, the exiting of the containers and pallets is aided by an ascending aircraft manoeuvre to raise the nose portion of the aircraft with respect to the tail portion. Once outside the aircraft, the canopies deploy and the pallets and containers descend safely to the ground.

Due to the high weight of the containers and the respectively loaded number of containers (sometimes up to and more than 24 pallets with equipment stacked in two rows with twelve pallets each), the cargo restraining barrier at the fore portion of the cargo hold needs to prevent the whole cargo load from shifting forward during flight to prevent damage to the aircraft and injury to the flight crew. It should be noted that the cargo restraining barrier should be capable of preventing forward movement of the entire maximum cargo load even when the cargo is under acceleration towards the cockpit of three times the force of gravity.

Figure 1:
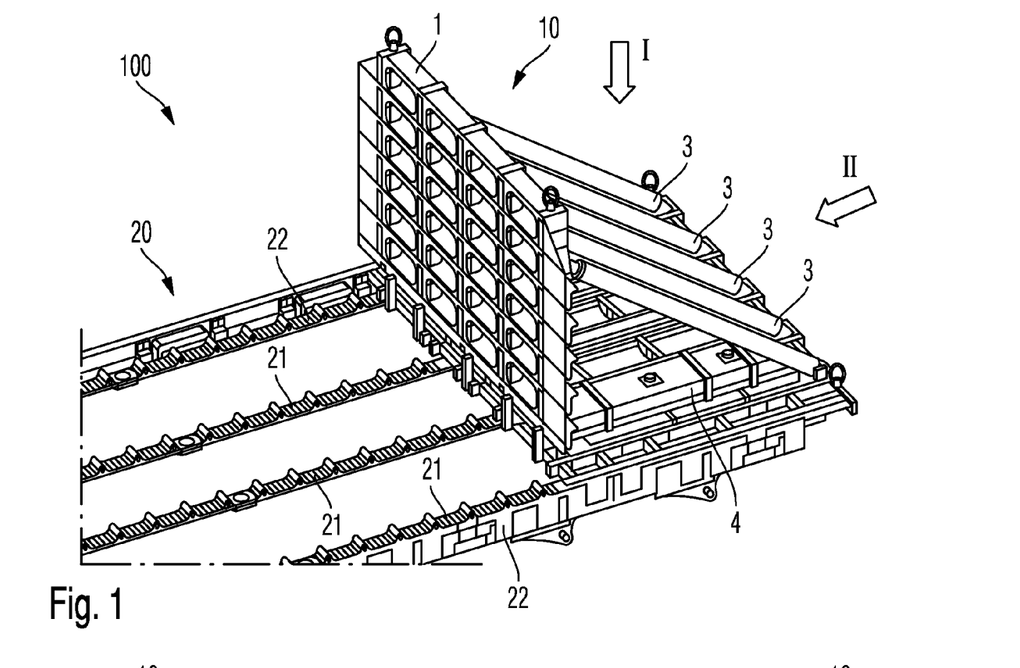
FIG. 1 schematically illustrates a perspective view of a cargo restraining barrier.

FIG. 1 shows a schematic illustration of a perspective view of a cargo restraining barrier 10 as part of a cargo loading system 100 as indicated at least partially in FIG. 1. The cargo restraining barrier 10 is configured to restrain an ULD or rows of ULDs (not shown in FIG. 1) from movement across a cargo deck surface of an aircraft, specifically in the fore to aft direction of the aircraft in a deceleration manoeuvre.

The cargo deck surface 20 is indicated as including cargo loading devices and aids having a plurality of guiding and fastening rails 21, wherein in the example shown in FIG. 1 only four of them are shown. The guiding and fastening rails 21 may comprise roller tracks with rollers and/or power drive units (PDUs) to guide and propel cargo loaded onto the cargo deck surface within the interior of the cargo hold. Intermittently, the guiding and fastening rails 21 may comprise mounting areas including an opening and a corresponding tie down ring to safely fasten ULDs to the aircraft fuselage. The opening may extend below the cargo deck surface 20, with the tie down ring being irremovably mounted to the fuselage at a bottom surface of the opening. The tie down rings may be mounted in a pivoting fashion such that the tie down rings may be moved from an extended position to a stowing position within the rails 21.

The cargo deck surface 20 may further comprise guidance and restraint systems 22 including locking units at the edge or side portions of the cargo hold where cargo items may be secured. The locking units may in particular by so-called "x-locks" that secure cargo individually from movement in x-direction.

The cargo restraining barrier 10 is configured to be mounted to the cargo deck surface 20, i.e. the guiding and fastening rails 21, in a normal operational state. During a logistics transport condition, the cargo restraining barrier 10 may also be secured by the locking units of the guidance and restraint systems 22.

The cargo restraining barrier 10 comprises a base portion 4 having a top side and a bottom side opposite to the top side and a barrier portion 1 which is arranged substantially perpendicular to the base portion 4 at a first edge on the top side of the base portion 4, the first edge being the aft edge side of the base portion 4 with respect to the cargo hold of the aircraft.

A plurality of force diverting struts 3 are mounted in parallel along the extension of the base portion 1 between a backside of the barrier portion 1 and a second edge of the base portion 4 opposite to the first edge of the base portion 4. The force diverting struts 3 may be fixedly connected to the barrier portion 1 by barrier hinges and fixedly connected to the base portion 4 by base hinges. FIG. 1 exemplarily shows five force diverting struts 3 that are spaced apart equally, however, any number of force diverting struts 3 higher or lower than five may as well be feasible, again depending on the trade-off between mechanical stability and system weight of the cargo restraining barrier 10.

The force diverting struts 3 are configured to divert forces acting on the front side of the barrier portion 1 towards the base portion 4.

Figure 2:
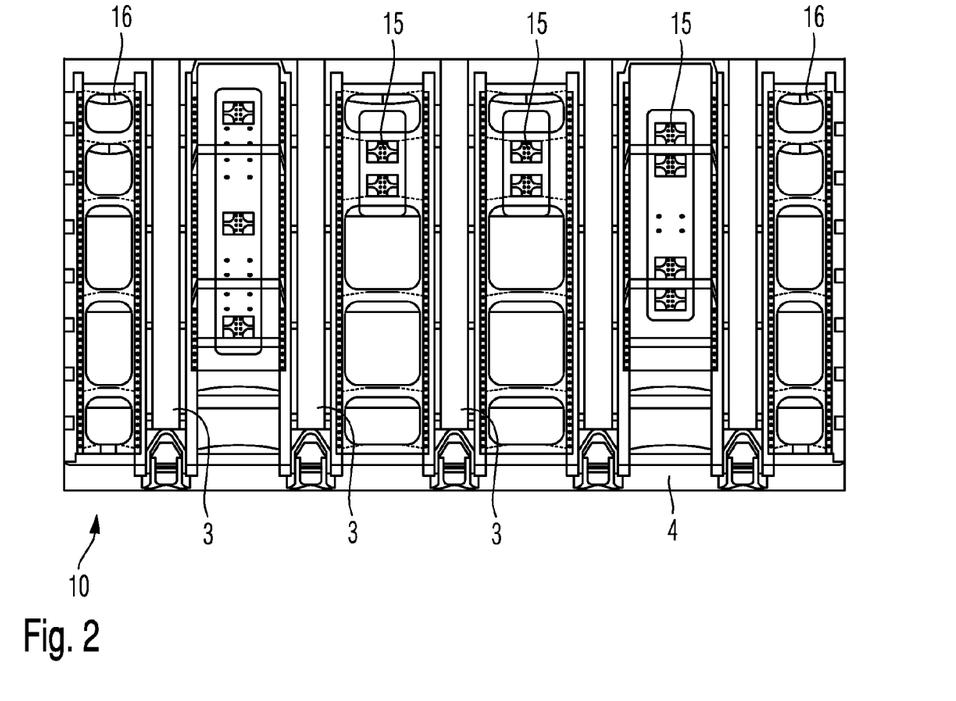
FIG. 2 schematically illustrates a top down view I of the cargo restraining barrier of FIG. 1.

FIG. 2 schematically shows a top down view on the top side of the base portion 4 in the direction of arrow {I} in FIG. 1. A plurality of seat rail tracks 15 are mounted to the top side of the base portion 4. The seat rail tracks 15 may be standard size tracks and may be used as stowage room for cargo restraining assemblies, for example restraining components arranged in a center guidance and restraining channel in the middle between the center guidance and restraining rails 21. Such guidance and restraining channel may be used for cargo loading systems 100 being loaded with multiple rows of cargo containers in order to secure the containers between adjacent rows. The cargo restraining assemblies may be safely stowed away using the seat rail tracks 15 so that no components may get lost.

At the sides of the base portion 4, notched side rails 16 may be provided to facilitate locking the cargo restraining barrier 10 to the guidance and restraining systems 22 of the cargo deck surface 20. This may be useful during logistic transport flights, where the cargo restraining barrier 10 does not need to fulfil its function and may be considered as yet another cargo item to be transported.

Figure 4:
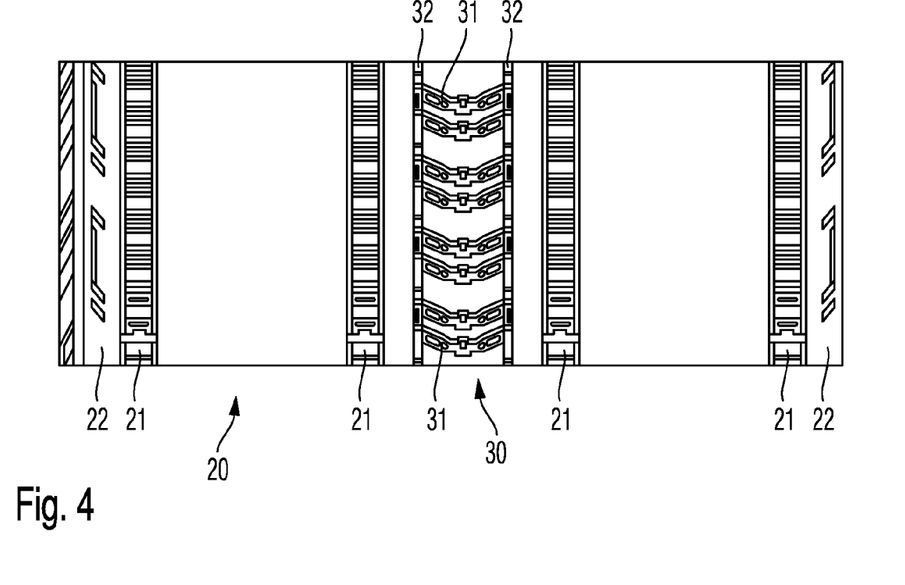
FIG. 4 schematically illustrates a top down view on a cargo deck surface of a cargo hold according to an embodiment.

FIG. 4 schematically illustrates a top down view on the cargo deck surface 20 with four guidance and restraining rails 21 and two guidance and restraint systems 22 at the outer edges of the cargo hold. Moreover, between the middle two guidance and restraining rails 21 a center guidance and vertical restraining channel (CGVR) comprising a series of cargo restraining assemblies 30 is arranged. The CGVR runs substantially in parallel to the guidance and restraint systems 22 in x-direction, i.e. from fore to aft of the cargo hold of the aircraft.

The cargo restraining assemblies 10 comprise two guidance and restraint bars 32 each. Adjacent cargo restraining assemblies 10 are connected to each other so that the guidance and restraint bars 32 form a continuous guiding and restraint rail channel running substantially in the middle of the cargo hold from aft to fore of the aircraft 40. The cargo hold of FIG. 4 is designed to hold two rows of pallets or cargo containers next to each other, where the pallets or cargo containers of the left row are stowed between the left hand side guidance and restraint systems 22 and the CGVR and the pallets or cargo containers of the right row are stowed between the CGVR and the right hand side guidance and restraint systems 22 in FIG. 4.

The pallets or cargo containers may be standardized cargo items that have a protruding bottom edge which is guided and restrained from moving in y-direction, i.e. perpendicular to the x-direction on the cargo deck surface, by the respective one of the guidance and restraint bars 32.

Figure 5:
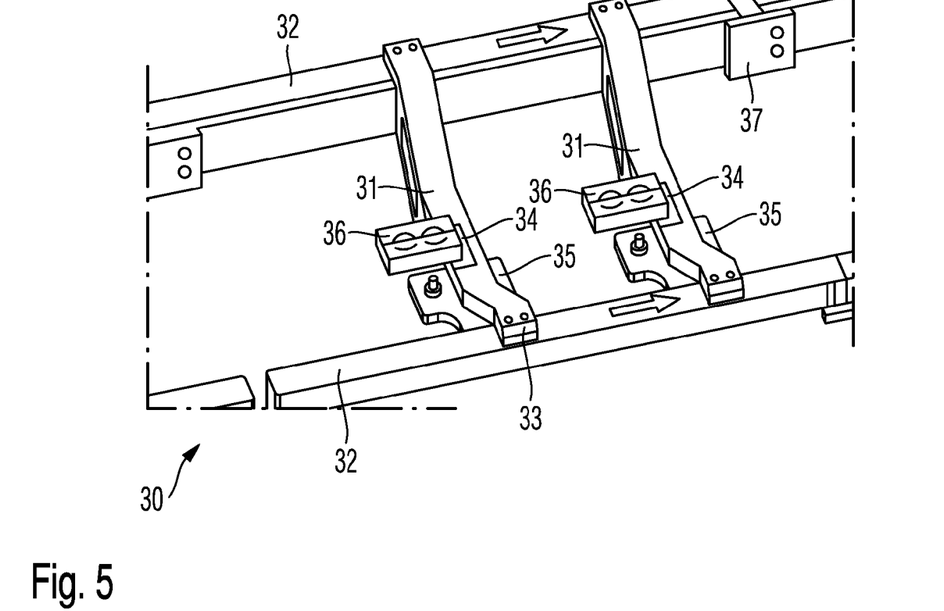
FIG. 5 schematically illustrates a cargo restraining assembly according to an embodiment.
Figure 6:
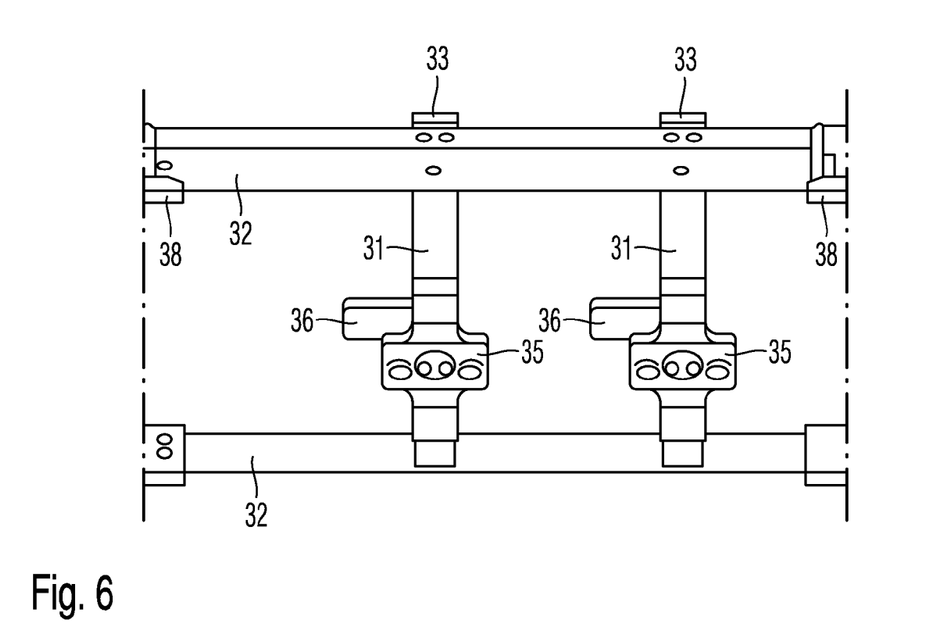
FIG. 6 schematically illustrates a bottom view of the cargo restraining assembly of FIG. 5 according to an embodiment.

FIG. 5 schematically shows a single one of the plurality of cargo restraining assemblies 30 in greater detail. FIG. 6 shows the respective cargo restraining assembly 30 of FIG. 5 from the bottom side. The cargo restraining assembly 30 is configured to be mounted to a cargo deck surface 20 of an aircraft, for example the cargo deck surface 20 illustrated in FIG. 4. The cargo restraining assembly 30 comprises two guidance and restraint bars 32 running in parallel to each other, for example made from aluminum or an aluminum alloy. Between the two guidance and restraint bars 32 a number of lateral brackets 31 spanning between the two guidance and restraint bars 32 are arranged. The lateral brackets 31 may be fixedly connected to each of two guidance and restraint bars 32 by a bracket mount 33 on the edges of the lateral brackets. The bracket mounts 33 may be bolted or riveted to the guidance and restraint bars 32.

The lateral brackets 31 include a bracket foot 35 formed integrally with the lateral bracket 31 and a quick release mechanism 34 which is installed on the bracket foot 35. The quick release mechanism 34, for example comprising a quick release skewer with a rotating lever, may be configured to quick-releasably couple the bracket foot 35 to a seat track profile mounted to a cargo deck surface 20 of the aircraft 40. By coupling the bracket foot 35 to the seat track profile, the plurality of cargo restraining assemblies 30 may be easily mounted on the cargo deck surface via the quick release mechanisms 34.

The bracket foot 35 may for example comprise steel as material in order to provide sufficient mechanical stability. The lateral bracket 31 may be implemented by forming two carrier arms extending upwards to each side of the bracket foot 35. The two carrier arms may be angled or slanted upwards so that the bracket foot 35 rests beneath the upper surface defined by the guidance and restraint bars 32. The two guidance and restraint bars 32 themselves include an angled restraining flange each. The flange is oriented outwards, i.e. away from the lateral brackets 31 and may be angled under an angle of 90° so that the guidance and restraint bars 32 have an upright portion preventing movement of adjacent cargo items in y-direction and a flange portion preventing movement of adjacent cargo items in z-direction. The restraint in z-direction is effected by sliding the protruding edges of pallets or cargo containers under the flange portion so that the flange portion overlaps the protruding edges and holds them on the cargo deck surface.

Figure 3:
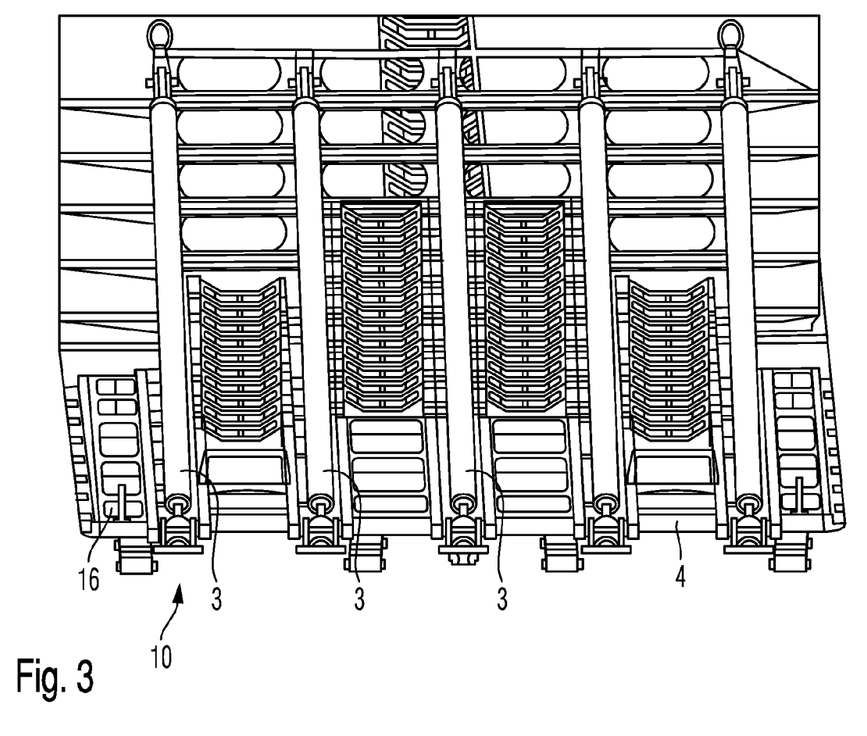
FIG. 3 schematically illustrates a back view II of the cargo restraining barrier of FIG. 1.

The lateral brackets 31 may further include a bracket rest 36 formed on top of the bracket foot 35, the bracket rest 36 being formed to fit to a seat track profile, for example the seat track profile installed on the cargo restraint barrier 10 of FIGS. 1 to 3. This facilitates stowing the individual cargo restraining assemblies on the cargo restraint barrier 10. The number of lateral brackets 31 arranged in parallel to each other is shown to be two in FIG. 5, however, any other number of lateral brackets 31 may be possible as well.

Figure 7:
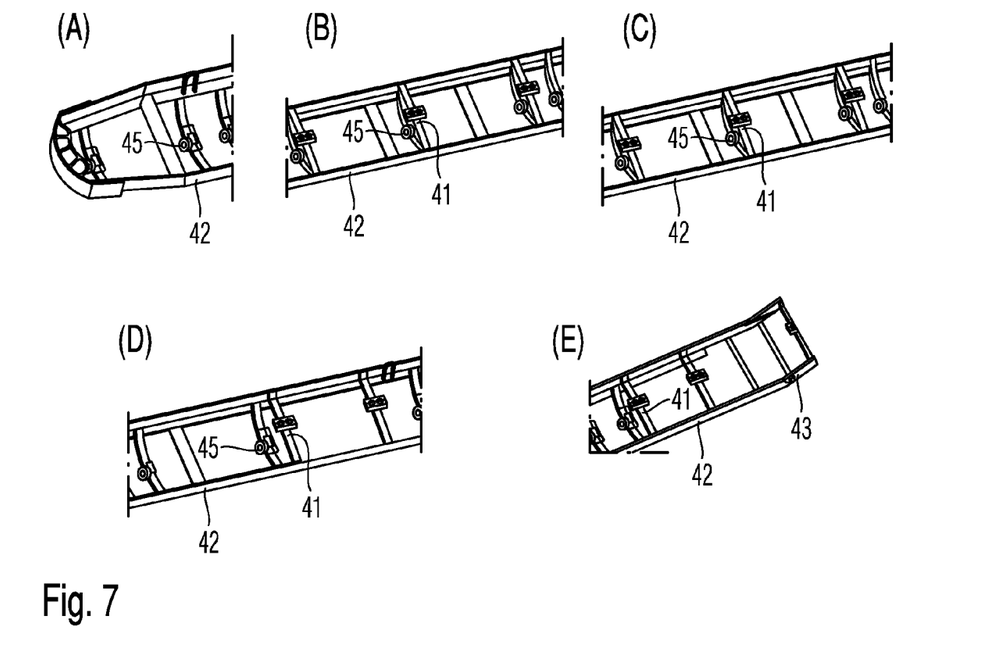
FIG. 7 schematically illustrates variants of cargo restraining assemblies for use on a loading ramp according to an embodiment.
Figure 8:
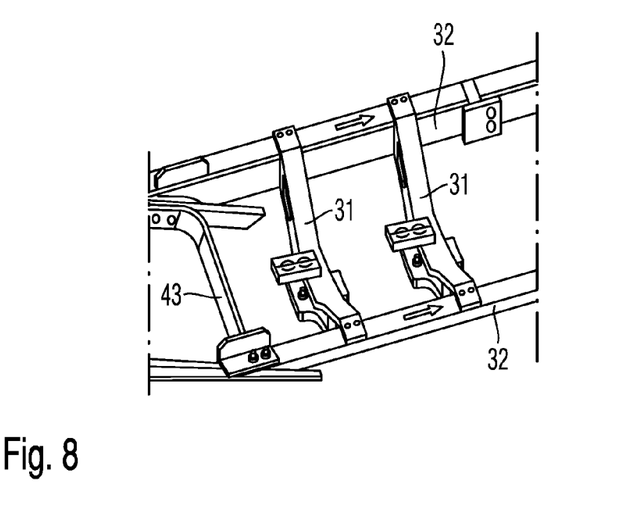
FIG. 8 schematically illustrates a transition cargo restraining assembly according to an embodiment.

FIG. 7 shows different variants (A) to (E) of cargo guiding assemblies as they may be used on the floor of a loading ramp of an aircraft. Since there are no cargo items to be secured on the loading ramp during flight of the aircraft, the variants (A) to (E) only need to provide guidance in x-direction and restraint in y-direction for the cargo items being loaded to or unloaded from the cargo hold. Variant (A) shows an end portion of the CGVR which may be installed at the very aft portion of the loading ramp. Variants (B), (C) and (D) may be installed on the middle part of the loading ramp, whereas variant (E) comprises a ramp transfer portion 43 for transferring the cargo items from the loading ramp to the line of cargo restraining assemblies 30 and vice versa. FIG. 8 shows the respective transfer portion piece 43 on the side of the line of cargo restraining assemblies 30 in greater detail.

Each of the variants includes one or more lateral brackets 41 which are connected between guidance bars 42. Unlike the guidance and restraining bars 32, the guidance bars 42 do not comprise a flange portion. Similarly to the bracket foot 35, a bracket foot 45 with a quick release mechanism is provided in the center of the lateral brackets 41 to mount the cargo guiding assemblies to the floor of the loading ramp of the aircraft.

Figure 9:
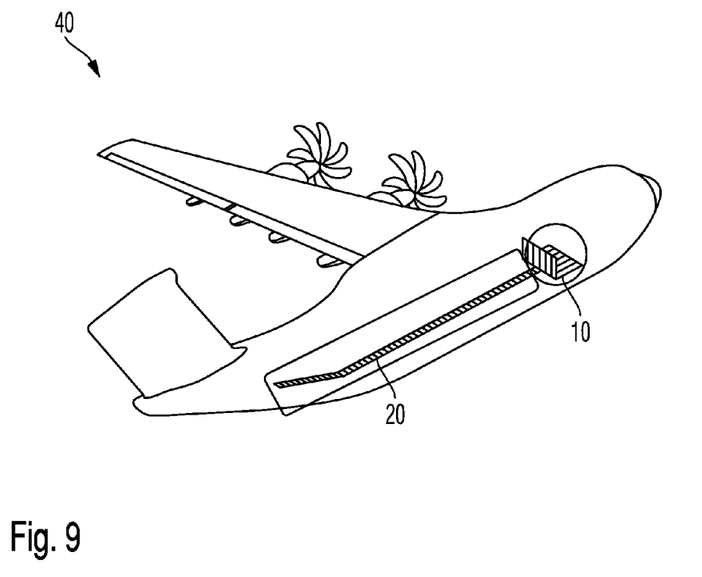
FIG. 9 schematically illustrates an aircraft having a cargo loading system according to the present disclosure.

FIG. 9 schematically illustrates an aircraft 40 according to the present disclosure. Particularly, FIG. 9 shows a cargo hold within the aircraft 40, the cargo hold being equipped with a cargo deck surface 20 and a corresponding cargo restraining barrier 10 at the fore end area of the cargo hold. The cargo deck surface 20 may be part of a cargo loading system according to the present disclosure in order to secure ULDs or other cargo items from lateral movement over the cargo deck surface 20. The cargo items that may be restrained by the cargo restraining barrier may include a range of military helicopters and vehicles, heavy engineering equipment, pallets and cargo containers.

The cargo loading systems according to the present disclosure are suitable for any aircraft, in particular (wide body) passenger aircraft having a cargo deck, pure cargo aircraft, and helicopters. The cargo restraining assemblies according to the present disclosure may also be used in other transportation, such as railway cargo coaches, cargo ships, trucks and truck trailers and the like.

While at least one exemplary embodiment of the present disclosure(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cargo restraining assembly configured to be mounted to a cargo deck surface of an aircraft, the cargo restraining assembly comprising:
   two guidance and restraint bars oriented parallel to each other; and
   at least one lateral bracket spanning between the two guidance and restraint bars, wherein the at least one lateral bracket is fixedly connected to each of the two guidance and restraint bars,
   wherein the at least one lateral bracket comprises a bracket foot formed integrally therewith and a quick release mechanism to couple the bracket foot to a seat track profile of the cargo deck surface of the aircraft in a manner that is quickly releasable,
   wherein the two guidance and restraint bars include respective angled restraining flanges that are oriented outwards, away from the at least one lateral bracket, the angled restraining flanges comprising a flange portion for preventing movement of adjacent cargo items in a z-direction, which is normal to a plane of extension of the cargo deck surface, and
   wherein the at least one lateral bracket is fixedly connected to each respective angled restraining flange.

2. The cargo restraining assembly according to claim 1, wherein the two guidance and restraint bars each have an upright portion preventing movement of adjacent cargo items in a v-direction, which is perpendicular to an x-direction that is defined in a fore-to-aft direction of the aircraft, and wherein the two guidance and restraint bars are arranged at one or more lateral edges of the adjacent cargo items to physically block a lateral movement thereof.

3. The cargo restraining assembly according to claim 1, wherein the at least one lateral bracket includes a bracket rest formed on top of the bracket foot, the bracket rest being formed to fit to the seat track profile.

4. The cargo restraining assembly according to claim 3, wherein the bracket foot and the bracket rest of the at least one lateral bracket are arranged between the two guidance and restraint bars.

5. The cargo restraining assembly according to claim 1, wherein the at least one lateral bracket is at least two lateral brackets, which are arranged in parallel to each other.

6. The cargo restraining assembly according to claim 1, wherein the two guidance and restraint bars comprise aluminum or an aluminum alloy.

7. The cargo restraining assembly according to claim 1, wherein the bracket foot comprises steel.

8. The cargo restraining assembly according to claim 1, wherein the at least one lateral bracket comprises two carrier arms extending upwards to each side of the bracket foot.

9. The cargo restraining assembly according to claim 1, wherein the quick release mechanism comprises a quick release skewer with a rotating lever.

10. The cargo restraining assembly according to claim 1, wherein the flange portion of the angled restraining flange is configured to overlap a top surface of a protruding edge of adjacent cargo items to hold the adjacent cargo items on the cargo deck surface.

11. A cargo loading system for a cargo hold of an aircraft, the cargo loading system comprising a plurality of cargo restraining assemblies having two guidance and restraint bars each,
   wherein the guidance and restraint bars of adjacent cargo restraining assemblies are connected to each other by a bar link,
   wherein the plurality of cargo restraining assemblies form a rail channel running substantially in a middle of the cargo hold from aft to fore of the aircraft, and
   wherein the two guidance and restraint bars include a respective angled restraining flange so that the guidance and restraint bars have a flange portion preventing movement of adjacent cargo items in a z-direction, which is normal to a plane of extension of a cargo deck surface of the aircraft.

12. The cargo loading system according to claim 11, comprising a plurality of cargo guiding assemblies connected to a respective last one of the plurality of cargo restraining assemblies, the plurality of cargo guiding assemblies being arranged on a floor of a loading ramp of the aircraft.

13. The cargo loading system according to claim 11, comprising a seat track profile mounted to a cargo deck surface of the aircraft, the plurality of cargo restraining assemblies being mounted on the seat track profile via a respective quick release mechanism of each of the plurality of cargo restraining assemblies.

14. The cargo loading system according to claim 11, wherein the two guidance and restraint bars each have an upright portion preventing movement of adjacent cargo items in a y-direction, which is perpendicular to an x-direction that is defined in a fore-to-aft direction of the aircraft.

15. The cargo loading system according to claim 11, wherein the flange portion of the angled restraining flange is configured to overlap a top surface of a protruding edge of adjacent cargo items to hold the adjacent cargo items on the cargo deck surface.

16. An aircraft comprising a cargo hold having a cargo loading system, the cargo loading system comprising a plurality of cargo restraining assemblies having two guidance and restraint bars each,
   wherein the guidance and restraint bars of adjacent cargo restraining assemblies are connected to each other by a bar link,
   wherein the plurality of cargo restraining assemblies form a rail channel running substantially in a middle of the cargo hold from aft to fore of the aircraft, and
   wherein the two guidance and restraint bars include a respective angled restraining flange so that the guidance and restraint bars have a flange portion preventing movement of adjacent cargo items in a z-direction, which is normal to a plane of extension of a cargo deck surface of the aircraft.

17. The aircraft according to claim 16, wherein the cargo loading system comprises a plurality of cargo guiding assemblies connected to a respective last one of the plurality of cargo restraining assemblies, the plurality of cargo guiding assemblies being arranged on a floor of a loading ramp of the aircraft.

18. The aircraft according to claim 16, wherein the cargo loading system comprises a seat track profile mounted to a cargo deck surface of the aircraft, the plurality of cargo restraining assemblies being mounted on the seat track profile via a respective quick release mechanism of each of the plurality of cargo restraining assemblies.

19. The aircraft according to claim 16, wherein the two guidance and restraint bars each have an upright portion preventing movement of adjacent cargo items in a y-direction, which is perpendicular to an x-direction that is defined in a fore-to-aft direction of the aircraft.

20. The aircraft according to claim 16, wherein the flange portion of the angled restraining flange is configured to overlap a top surface of a protruding edge of adjacent cargo items to hold the adjacent cargo items on the cargo deck surface.

\* \* \* \* \*